United States Patent [19]
Tooley

[11] 3,934,953
[45] Jan. 27, 1976

[54] SHAFT BEARING AND METHOD OF ASSEMBLING THE SAME

[75] Inventor: Robert W. Tooley, Osceola, Ind.

[73] Assignee: Reliance Electric Company, Mishawaka, Ind.

[22] Filed: May 3, 1974

[21] Appl. No.: 466,604

[52] U.S. Cl. .................................. 308/72; 29/148.4
[51] Int. Cl.² ..................... F16C 9/06; B21D 53/10
[58] Field of Search .......... 308/29, 72, 238, DIG. 8; 29/148.4, 149.5

[56] References Cited
UNITED STATES PATENTS

| | | | |
|---|---|---|---|
| 3,345,116 | 10/1967 | Hilton | 308/72 |
| 3,528,710 | 9/1970 | Roesner et al. | 308/72 |
| 3,552,808 | 1/1971 | Mathers et al. | 308/72 |
| 3,687,509 | 8/1972 | Schweizer | 308/72 |
| 3,820,861 | 6/1974 | Strang | 308/72 |

Primary Examiner—M. Henson Wood, Jr.
Assistant Examiner—Gene A. Church
Attorney, Agent, or Firm—Marmaduke Hobbs

[57] ABSTRACT

A shaft bearing including a bearing insert and a housing constructed of plastic and having a body and a retainer for the bearing insert, the plastic housing body and the retainer being integrally joined by an ultrasonic vibration method to fuse the interface between the two parts to form a unitary housing structure and secure the bearing insert in place in the bearing housing. The invention includes the method of assembling the plastic housing parts and bearing insert, and welding the housing body and the retainer by ultrasonic vibration to secure the bearing insert in place in the housing and conform the internal surface of the body and retainer to the adjacent external surface of the bearing insert.

13 Claims, 8 Drawing Figures

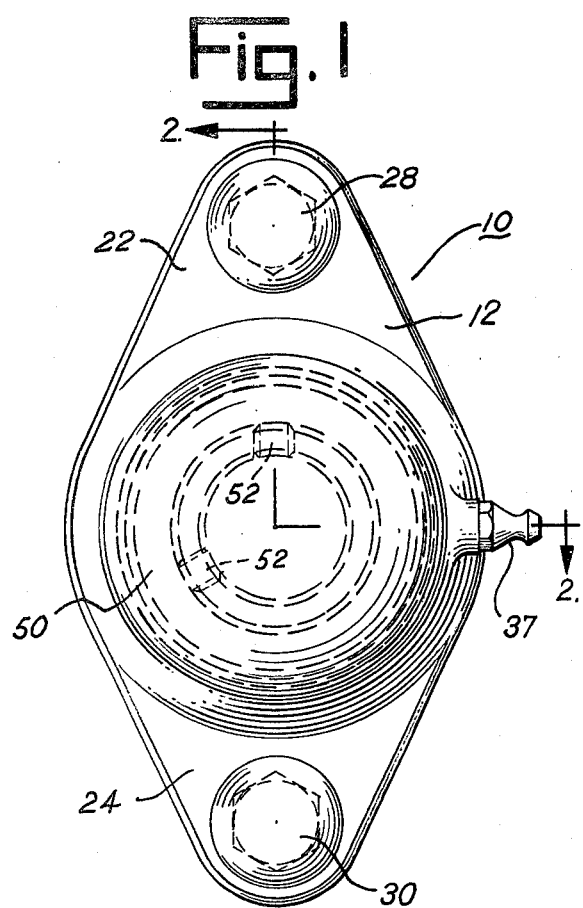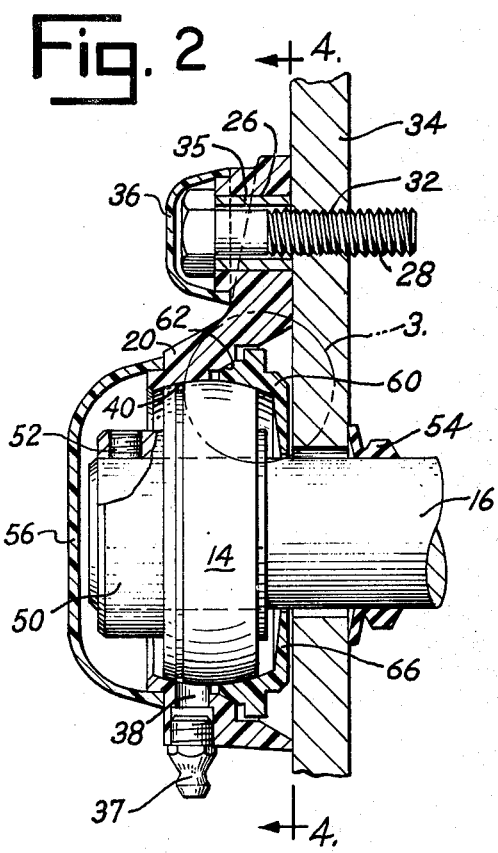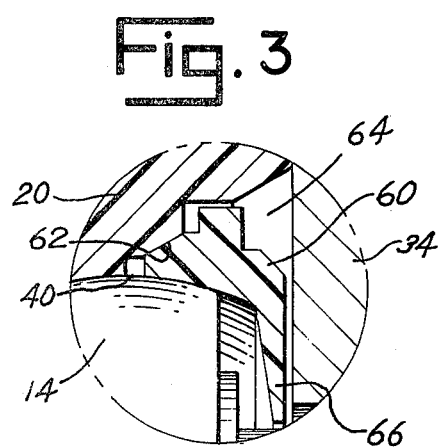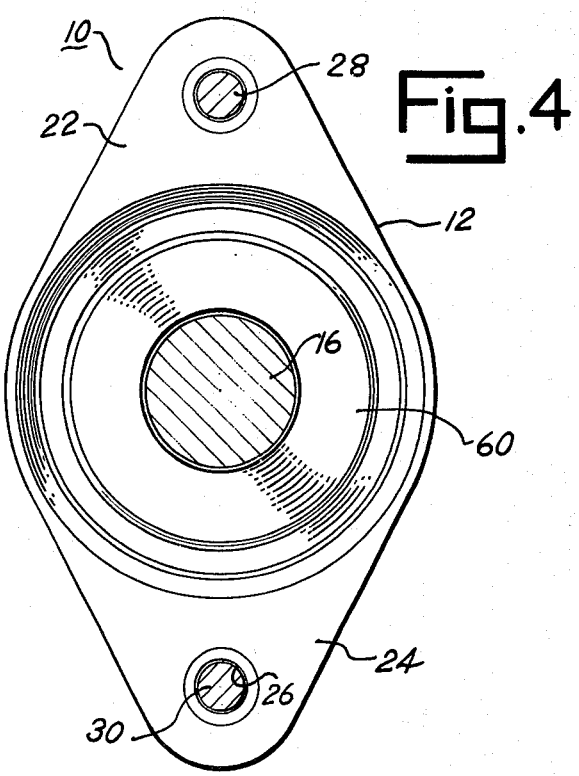

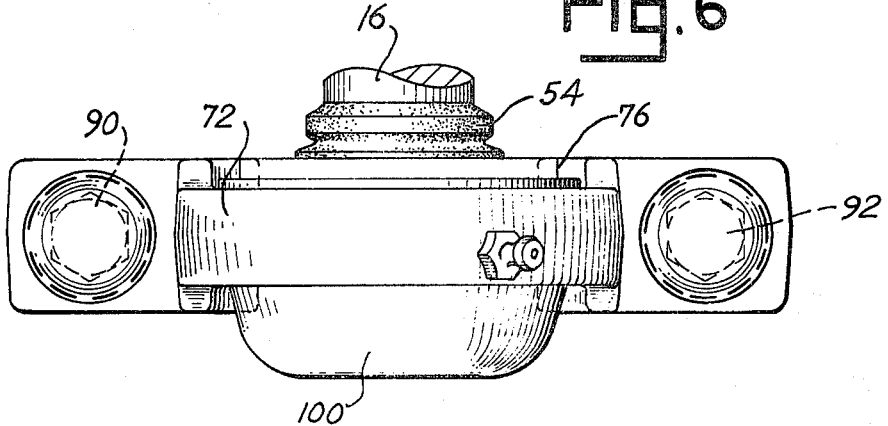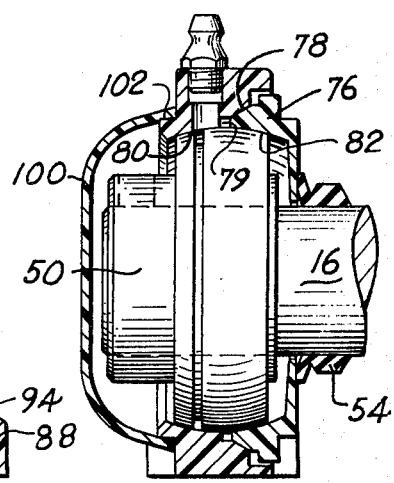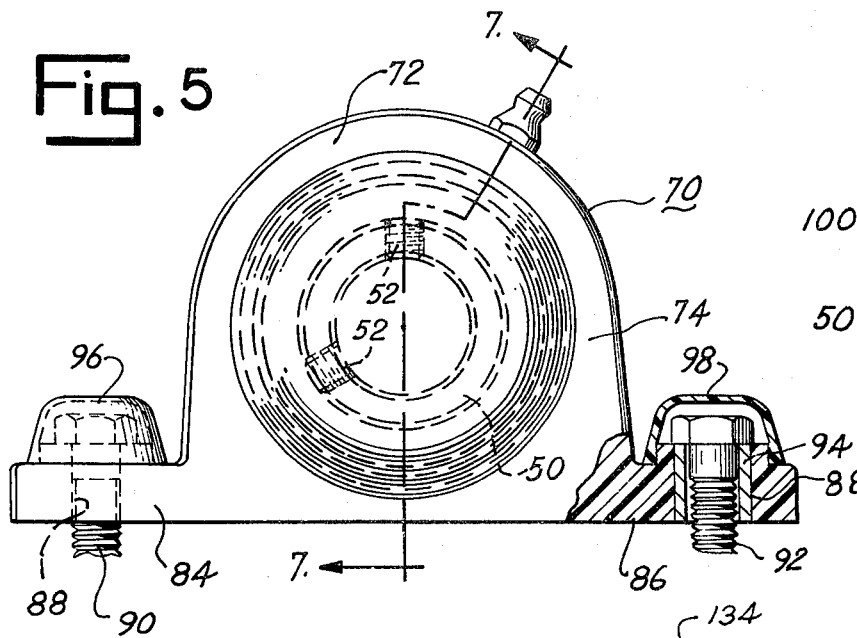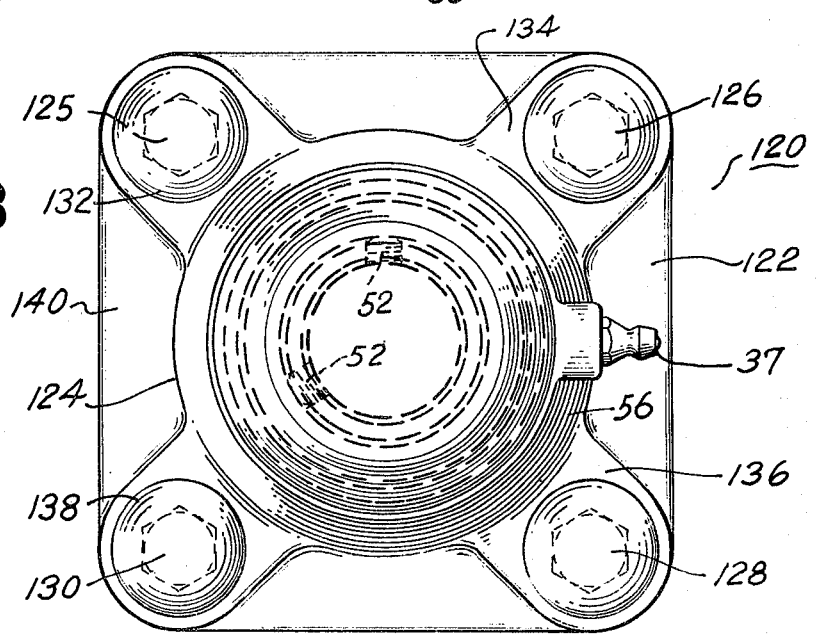

SHAFT BEARING AND METHOD OF ASSEMBLING THE SAME

In the past most bearing and pillow block housings have been constructed of metal, such as steel, in all but the smaller bearings. In certain applications and installations, however, the metal housings are not satisfactory, in that they tend to corrode excessively, particularly in installations where the bearing or pillow blocks are subjected to water containing one or more active chemicals, such as encountered in chemical processing plants, commercial kitchens and food processing plants. The corrosion often produces areas on or in the bearing housing in which dirt and other foreign matter can accumulate and form media for the growth of bacteria. Further, the corrosion may prevent the bearing or pillow block from giving optimum performance, and may require frequent service and cause premature failure. Some installations, while requiring relatively large bearing or pillow blocks, are required to carry only relatively light loads, and hence the strength afforded by steel or cast iron is not necessary. Notwithstanding the lack of need for the strength of steel and cast iron, these bearings and pillow blocks were nevertheless, used, since satisfactory and reliable bearings of other materials were not available. It is therefore one of the principal objects of the present invention to provide bearings or pillow block assemblies in which the housings are constructed of plastic material and in which the bearing insert, of either ball or roller bearings, may be of metal or any other suitable bearing material.

Another object of the invention is to provide a shaft bearing or pillow block assembly having a plastic housing which is formed in two or more separate pieces, and in which the pieces are fused or welded together to form a unitary and integral housing body to retain the bearing insert in place, yet permit the insert to thereafter be effectively aligned with the shaft.

Still another object of the invention is to provide a method of fabricating and assembling bearing and pillow block housings, in which several separate parts of the housing are fabricated of plastic material, the bearing insert and housing parts assembled, and the housing parts fused or welded together by ultrasonic vibration, securing the bearing insert in place in a manner which permits it to be readily aligned with the shaft during installation.

A further object is to provide a bearing or pillow block housing of the aforesaid type, the parts of which can be easily and economically fabricated, without exacting tolerances, and then assembled and fused together to provide exacting tolerances, and which effectively resists corrosion under most operating conditions in chemical and food processing and handling plants and will provide a long, substantially service-free life under normal operating conditions.

Additional objects and advantages of the present invention will become apparent from the following description and accompanying drawings wherein:

FIG. 1 is an elevational view of a flange bearing embodying the present invention;

FIG. 2 is a cross sectional view of the flange bearing shown in FIG. 1, the section being taken on line 2 — 2 of the latter figure;

FIG. 3 is an enlarged fragmentary sectional view of the bearing shown in FIGS. 1 and 2, the area of the enlargement being indicated by the circle on FIG. 2;

FIG. 4 is an elevational view of the side opposite that shown in FIG. 1;

FIG. 5 is a side elevational view of a pillow block embodying the present invention.

FIG. 6 is a top plan view of the pillow block shown in FIG. 5;

FIG. 7 is a sectional view of the pillow block shown in FIGS. 5 and 6, the section being taken on line 7 — 7 of FIG. 5; and FIG. 8 is an elevational view of another model of a flange bearing embodying the present invention.

Referring more specifically to the drawings, and to the embodiment of the invention shown in FIGS. 1 through 4, numeral 10 designates generally a flange bearing with the present invention incorporated therein and numeral 12 indicates the housing of the bearing, 14 a bearing insert and 16 a shaft journalled in the bearing insert. The bearing insert is of conventional construction, the one shown being ball bearing, having an outer and inner race with the balls and cage disposed between the two races. Most of the details of the bearing insert are not important with respect to the present invention; however, the peripheral surface of the outer race is curved in a manner often referred to in the trade as spherical. Other types of bearing inserts than the one shown in the drawings may be used to satisfy particular application and installation requirements.

The housing 12 consists of a main body 20 having flanges 22 and 24 with a hole 26 in each of the flanges for receiving bolts 28 and 30, the bolts extending through the holes and being received in a threaded hole 32 in a wall 34 of a machine or other supporting structure. A reinforcing sleeve 35 may be used in each of the flange holes, and a cap 36 may be used to enclose and protect the screws. A lubricating fixture 37 is disposed in the side wall of body 20 and is connected to the cavity in the bearing by a passage 38, the fixture being secured in place by threads or any other suitable securing means. The internal surface 40 of the housing body is curved to correspond to the external shape of the bearing insert, thus permitting the bearing insert to turn on its transverse axis to permit alignment of the bearing insert with respect to the shaft as the bearing is assembled. The bearing insert is retained in place on shaft 16 by a collar 50 held firmly in place on the end of the shaft by a plurality of set screws 52 extending therethrough and seating on the surface of the shaft. The lubricant is retained in the bearing cavity on one side by a rubber seal 54 disposed on the shaft on the internal side of wall 34, and on the other side by a removable cap 56 which may be of metal or plastic, including transparent plastic.

The bearing insert is retained in place in the body by a retainer 60 seated on an annular surface 62 in an annular recess 64. The intersurface of the annular retainer is curved to correspond to the peripheral surface of the bearing insert to permit adjustment or alignment of the bearing insert with respect to the shaft in the same manner as the surface 40 of the body, although initially the inner surface of the body and the retainer do not have to be held to exacting tolerances.

One of the primary features of the present invention is the construction of the body 20 and retainer 60 of plastic material, such as thermoplastic material or any other suitable plastic, the parts of which can be joined by the ultrasonic vibration fusion method referred to herein. The plastic body and retainer are molded, using conventional methods, preferably injection molding, to produce the desired configuration of bearing housing parts. When the bearing is installed, it is assembled by seating the bearing insert on the internal surface 40 of the body and then seating the retainer 60 in place, thus enclosing or entrapping the bearing insert in the cavity, with the spherical surface of the bearing insert in contact with the spherical surface of the bearing insert in contact with the spherical surfaces of the body. At this stage of the assembly operation, the retainer is normally in spaced relation to the surface of the bearing insert, but is in contact with the housing body at the area or interface where the two parts are to be joined.

With the bearing assembled in this manner, it is installed using bolts 28 and 30 to secure the housing to a supporting structure such as wall 34. With the bearing insert mounted in place on the shaft, collar 50 is tightened thereto to hold the insert in proper position. The bearing insert, while fitting snugly in the cavity of the housing and against the internal spherical walls of the body and retainer, is nevertheless capable of rotating on its transverse axis sufficiently to permit the bearing insert and shaft to become effectively aligned with one another for optimum performance during installation of the bearing and shaft. The method involving the ultrasonic vibration is well known in the art and results in a momentary fusion between the contacting interfaces of the two parts of the bearing housing. Since a unitary housing structure is formed, the bearing insert is retained permanently in the housing by the spherical curvature on the body retainer and periphery of the bearing insert and flange 66, and it is not normally feasible to replace the parts of the bearing in the event of the failure of either the bearing insert or the housing.

With the bearing parts assembled in the foregoing manner, the next step consists of an ultrasonic vibration welding operation to join integrally and permanently body 20 and retainer 60 together, so that the two parts in effect form a single piece entrapping the bearing insert in the housing. The adjoining step involves an ultrasonic vibration method in which fusion occurs at the interface 62 between the contacting surfaces of the body 20 and retainer 60, thus causing the two parts to adhere firmly to one another and in effect become a unitary part. The horn of the ultrasonic vibration equipment is placed in contact with the retainer, and when operated, causes the retainer to seat on and conform to the curvature of the surface of bearing insert 14, and produces fusion at the interface 62 to weld the body and retainer together. Since the body and the retainer are normally of the same plastic material, the final housing structure, consisting of the body and retainer, is thereafter a unitary permanent structure.

In the ultrasonic vibration method, the body and retainer of thermoplastic material are subjected to the vibration which produces a rise in temperature at the interface between the two parts. The temperature rise is produced by intermolecular friction and is sufficient to produce localized fusion and a chemical bond, resulting in a uniform weld between the parts. Most thermoplastic materials are capable of being welded in this manner, and a number of plastics are capable of being utilized in the present bearing assembly in which the parts of the housing and retainer are joined by the foregoing ultrasonic vibration method. These include polyesters, nylon and other general purpose and engineering plastics. The equipment involves the use of an ultrasonic generator which converts electrical energy into a mechanical vibratory energy, in combination with a converter which is attached to a horn, usually designed specifically for the particular application. The foregoing equipment is available commercially and the details thereof are not important to the description of the construction and method relative to the present plastic bearing assembly. While the process and equipment are well known and available to the public, detailed information concerning the process, equipment and plastics suitable for use in the construction of the present bearing housing and retainer, is disclosed in a publication entitled "A Guide To Ultrasonic Plastic Assembly" copyrighted in 1973 by Branson Instruments, Inc., the contents of which are incorporated herein by reference and made part of this disclosure.

In the embodiment of the invention illustrated in FIGS. 5, 6 and 7, a pillow block 70 is shown, having a housing 72 constructed of plastic material such as thermoplastic polyester, and having parts joined by fusion resulting from ultrasonic vibration applied to the parts. Since this embodiment involves many of the same parts of the flange bearing illustrated in FIGS. 1 through 4, like parts have been given like numerals and those parts will not be described in detail with reference to the pillow block. Housing 72 consists of a body 74 and an annular retainer 76 seated on a surface 78 in an annular recess 79 in the body. The spherical surface of bearing insert 14 is in contact with spherical surfaces 80 and 82 on the body and retainer when these latter parts are joined together. In the assembly operation the bearing insert is seated in the body on the spherical surface and the retainer is pressed in place, with the inner surface thereof in contact with annular surfaces 78 of the body. The body and retainer are then welded together by the ultrasonic vibration method previously described herein, causing fusion at the interface 78 between the body and retainer, thereby producing an integral, unitary housing consisting of the body 74 and retainer 76. Thus the bearing insert is held firmly and permanently in place in the housing, yet is capable of being aligned with the shaft during installation. The pillow block has two flanges 84 and 86 extending laterally on the body, each of which is provided with a hole 88 for receiving bolts 90 and 92, respectively. A sleeve 94 is preferably provided in each hole to reinforce the flange at the hole and thereby give greater stability and reliability to the pillow block when operating under stress. The bolts may be enclosed in plastic caps 96 and 98, and a cap 100 secured to an annular shoulder 102 on body 74 encloses the bearing cavity and retains the lubricant therein. The cap may be of transparent plastic material which permits inspection of the bearing and the lubricant while the bearing is in operation; however, other suitable material may be used in place of the transparent plastic.

FIG. 8 illustrates a further application of the present invention and involves a flange bearing 120 having a housing 122 constructed of a body 124 in combination with an annular retainer which is joined to the body by the ultrasonic vibration method previously described herein, after the bearing insert has been assembled in the housing. In the modification of FIG. 8, four mounting screws 125, 126, 128 and 130 extend through holes in bosses 132, 134, 136 and 138, respectively, on flange 140 of body 124. The entire housing structure, with the exception of sleeves in the holes through which the screws extend, is constructed of plastic material. The body and the retainer, after being welded in the manner previously described, form an integral, unitary structure with one another.

While several embodiments of the present shaft bearing and method have been described and shown herein, various other modifications and changes may be made without departing from the scope of the invention.

I claim:

1. A shaft bearing comprising a housing having a body with a cavity therein, a bearing insert seating in said cavity for journalling a shaft, a retainer for seating on said body for securing said bearing insert in place in said housing, said body and said retainer being constructed of a plastic material joined together at their interface by ultrasonic vibration, forming an integral body retainer structure with the bearing insert entrapped in said body cavity.

2. A shaft bearing as defined in claim 1 in which said body and retainer are constructed of thermoplastic material and said body and retainer are fused together at their interface.

3. A shaft bearing as defined in claim 1 in which said body and retainer are constructed of a thermoplastic polyester and a chemical bond retains said body and retainer permanently together.

4. A shaft bearing as defined in claim 1 in which the outer surface of the insert is of a spherical shape and the inner surfaces of said body and retainer are in contact with said insert and are of spherical shape after said body and retainer have been joined together at their interface.

5. A shaft bearing as defined in claim 2 in which the outer surface of the insert is of a spherical shape and the inner surfaces of said body and retainer are in contact with said insert and are of spherical shape after said body and retainer have been joined together at their interface.

6. A shaft bearing as defined in claim 1 in which said housing body is provided with flanges containing holes for anchoring screws.

7. A shaft bearing as defined in claim 6 in which a metal sleeve is disposed in the holes in said flanges.

8. A shaft bearing as defined in claim 1 in which the external surface of the outer race is arcuate in cross section and the inner surface of said body and retainer engaged by said bearing insert is arcuate in cross section of the same configuration as the external surface of said outer race.

9. A shaft bearing as defined in claim 2 in which the external surface of the outer race is arcuate in cross section and the inner surface of said body and retainer engaged by said bearing insert is arcuate in cross section of the same configuration as the external surface of said outer race.

10. A method of constructing a bearing assembly, comprising forming a housing body of thermoplastic material with a cavity therein for receiving a bearing insert, forming a retainer of thermoplastic material, seating a bearing insert in said cavity seating said retainer on said body to hold said insert in said cavity, and subjecting said body and retainer to ultrasonic vibration to secure said body and retainer together and conforming the inner surfaces of said body and retainer to the adjacent outer surface of said insert.

11. A method of constructing a bearing assembly as defined in claim 10 in which said body and said retainer are welded at their interface by said ultrasonic vibration to produce a bond between said body and retainer.

12. A method of constructing a bearing assembly as defined in claim 10 in which said thermoplastic material is a polyester and said body and said retainer are fused at their interface to produce a chemical bond between said body and retainer.

13. A method of constructing a bearing assembly as defined in claim 11 in which said bearing insert is secured in the housing cavity when said body and said retainer are welded by the fusion of the plastic material at the interface between said body and said retainer during welding by said ultrasonic vibration.

* * * * *